US010061696B2

(12) United States Patent
Jones et al.

(10) Patent No.: US 10,061,696 B2
(45) Date of Patent: Aug. 28, 2018

(54) PARTIAL GARBAGE COLLECTION FOR FAST ERROR HANDLING AND OPTIMIZED GARBAGE COLLECTION FOR THE INVISIBLE BAND

(71) Applicants: Western Digital Technologies, Inc., Irvine, CA (US); Skyera, LLC, San Jose, CA (US)

(72) Inventors: Justin Jones, Burlingame, CA (US); Andrew J. Tomlin, San Jose, CA (US); Paul Sweazey, Santa Cruz, CA (US); Johnny A. Lam, Firestone, CO (US); Rodney N. Mullendore, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 40 days.

(21) Appl. No.: 15/166,694

(22) Filed: May 27, 2016

(65) Prior Publication Data
US 2016/0275012 A1    Sep. 22, 2016

Related U.S. Application Data

(63) Continuation of application No. 14/250,000, filed on Apr. 10, 2014, now Pat. No. 9,354,955.
(Continued)

(51) Int. Cl.
*G06F 11/00* (2006.01)
*G06F 12/02* (2006.01)
(Continued)

(52) U.S. Cl.
CPC ........ *G06F 12/0253* (2013.01); *G06F 11/073* (2013.01); *G06F 11/0793* (2013.01);
(Continued)

(58) Field of Classification Search
CPC ......... G06F 12/0246; G06F 2212/7201; G06F 2212/7205; G06F 2212/7207; G06F 3/064;
(Continued)

(56) References Cited

U.S. PATENT DOCUMENTS

| 6,065,020 A | 5/2000 | Dussud |
|---|---|---|
| 6,856,556 B1 | 2/2005 | Hajeck |

(Continued)

OTHER PUBLICATIONS

Agrawal et al., "Design Tradeoffs for SSD Performance," USENIX, 14 pgs. (2008).
(Continued)

*Primary Examiner* — Jason B Bryan
(74) *Attorney, Agent, or Firm* — McDermott Will & Emery LLP

(57) ABSTRACT

A method for managing garbage collection of memory locations in an DSD having a plurality of dies each having a plurality of memory blocks includes: selecting a physical region of memory to be garbage collected, the selected physical region being a subset of a block management region; and garbage collecting the selected physical region. The garbage collecting includes: determining one or more journals corresponding to the selected physical region, the journal comprising transaction entries indicating what logical data are written to memory locations in the selected physical region; determining whether the memory locations within the physical region contain valid data based on a comparison of information in the journal and a mapping table; and if valid data exists, copying valid data into memory locations in memory regions other than the selected physical region of memory. The selected physical region of memory is erased when the block management region is erased.

6 Claims, 7 Drawing Sheets

Related U.S. Application Data

(60) Provisional application No. 61/955,418, filed on Mar. 19, 2014.

(51) Int. Cl.
*G06F 11/07* (2006.01)
*G06F 12/00* (2006.01)

(52) U.S. Cl.
CPC .......... *G06F 12/00* (2013.01); *G06F 12/0246* (2013.01); *G06F 2212/1044* (2013.01); *G06F 2212/7205* (2013.01)

(58) Field of Classification Search
CPC .... G06F 3/0688; G06F 3/0679; G06F 3/0652; G06F 3/0608; G06F 12/0253; G06F 11/1068; G06F 3/0641; G06F 12/0891; G06F 2212/702; G06F 17/30191; G06F 9/466; G06F 11/073; G06F 11/0793; G06F 12/00
See application file for complete search history.

(56) References Cited

U.S. PATENT DOCUMENTS

| | | |
|---|---|---|
| 7,126,857 B2 | 10/2006 | Hajeck |
| 7,363,421 B2 | 4/2008 | Di Sena et al. |
| 7,412,585 B2 | 8/2008 | Uemura |
| 7,430,136 B2 | 9/2008 | Merry, Jr. et al. |
| 7,441,067 B2 | 10/2008 | Gorobets et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,509,471 B2 | 3/2009 | Gorobets |
| 7,596,643 B2 | 9/2009 | Merry, Jr. et al. |
| 7,610,438 B2 | 10/2009 | Lee et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,997 B1 | 3/2011 | Murray |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,233 B2 | 4/2012 | Schibilla et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,417 B2 | 6/2013 | Goss et al. |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 8,898,548 B1 | 11/2014 | Mullendore et al. |
| 2004/0109376 A1 | 6/2004 | Lin |
| 2006/0155917 A1 | 7/2006 | Di Sena et al. |
| 2007/0016721 A1 | 1/2007 | Gay |
| 2007/0094445 A1 | 4/2007 | Trika et al. |
| 2007/0204128 A1 | 8/2007 | Lee et al. |
| 2007/0300037 A1 | 12/2007 | Rogers et al. |
| 2008/0104308 A1 | 5/2008 | Mo et al. |
| 2008/0256287 A1 | 10/2008 | Lee et al. |
| 2008/0282024 A1 | 11/2008 | Biswas et al. |
| 2009/0019218 A1 | 1/2009 | Sinclair et al. |
| 2009/0049229 A1 | 2/2009 | Honda et al. |
| 2009/0119353 A1 | 5/2009 | Oh et al. |
| 2009/0150599 A1 | 6/2009 | Bennett |
| 2009/0177931 A1 | 7/2009 | Song et al. |
| 2009/0216938 A1 | 8/2009 | Conley et al. |
| 2009/0222643 A1 | 9/2009 | Chu |
| 2009/0240873 A1 | 9/2009 | Yu et al. |
| 2009/0241008 A1 | 9/2009 | Kim et al. |
| 2009/0241009 A1 | 9/2009 | Kong et al. |
| 2009/0259805 A1 | 10/2009 | Kilzer et al. |
| 2009/0292972 A1 | 11/2009 | Seol et al. |
| 2009/0327589 A1 | 12/2009 | Moshayedi |
| 2010/0030999 A1 | 2/2010 | Hinz |
| 2010/0082886 A1 | 4/2010 | Kwon et al. |
| 2010/0174847 A1 | 7/2010 | Paley et al. |
| 2010/0174849 A1 | 7/2010 | Walston et al. |
| 2010/0174851 A1 | 7/2010 | Leibowitz et al. |
| 2010/0211851 A1 | 8/2010 | Dixon |
| 2010/0241928 A1 | 9/2010 | Kim et al. |
| 2010/0250793 A1 | 9/2010 | Syu |
| 2010/0268871 A1 | 10/2010 | Lee et al. |
| 2010/0306451 A1 | 12/2010 | Johnson |
| 2011/0022778 A1 | 1/2011 | Schibilla et al. |
| 2011/0055458 A1 | 3/2011 | Kuehne |
| 2011/0066788 A1 | 3/2011 | Eleftheriou et al. |
| 2011/0072194 A1 | 3/2011 | Forhan et al. |
| 2011/0072333 A1 | 3/2011 | Kuo |
| 2011/0099321 A1 | 4/2011 | Haines et al. |
| 2011/0099323 A1 | 4/2011 | Syu |
| 2011/0099350 A1 | 4/2011 | Feldman et al. |
| 2011/0119464 A1 | 5/2011 | Karr et al. |
| 2011/0185112 A1 | 7/2011 | Goss |
| 2011/0191566 A1 | 8/2011 | Takamiya et al. |
| 2011/0191654 A1 | 8/2011 | Rub |
| 2011/0225346 A1 | 9/2011 | Goss et al. |
| 2011/0252289 A1 | 10/2011 | Patapoutian et al. |

(56) References Cited

U.S. PATENT DOCUMENTS

| | | |
|---|---|---|
| 2011/0283049 A1 | 11/2011 | Kang et al. |
| 2011/0320915 A1 | 12/2011 | Khan |
| 2012/0023387 A1 | 1/2012 | Wang et al. |
| 2012/0072639 A1 | 3/2012 | Goss et al. |
| 2012/0072807 A1 | 3/2012 | Cornwell et al. |
| 2012/0173795 A1 | 7/2012 | Schuette et al. |
| 2012/0191936 A1 | 7/2012 | Ebsen et al. |
| 2012/0226887 A1 | 9/2012 | Culley et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0290769 A1 | 11/2012 | Okubo et al. |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0047210 A1* | 2/2014 | Cohen ............... G06F 12/00 711/202 |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149828 A1 | 5/2014 | Chang et al. |
| 2014/0157078 A1 | 6/2014 | Danilak et al. |
| 2014/0181432 A1 | 6/2014 | Horn |
| 2014/0208003 A1 | 7/2014 | Cohen |
| 2014/0223255 A1 | 8/2014 | Lu et al. |
| 2014/0258769 A1 | 9/2014 | Baryudin et al. |
| 2015/0179254 A1* | 6/2015 | Alrod ............... G11C 13/0033 365/148 |

OTHER PUBLICATIONS

International Search Report and Written Opinion for International Patent Application No. PCT/US2013/062723 dated Jan. 16, 2014 (11 pages).

Kang et al., "A Superblock-Based Flash Translation Layer for Nand Flash Memory," Proceedings of the 6th ACM & IEEE International Conference on Embedded Software, pp. 161-170 (Oct. 22-25, 2006).

Toker, "Garbage Collection and TRIM in SSDs Explained—An SSD Primer," The SSD Review, 9 pgs. (2012).

Wei et al., "Reliably Erasing Data from Flash-Based Solid State Drives," FAST, 13 pgs. (2011).

* cited by examiner

PARTIAL GARBAGE COLLECTION FOR FAST ERROR HANDLING AND OPTIMIZED GARBAGE COLLECTION FOR THE INVISIBLE BAND

CROSS-REFERENCE TO RELATED APPLICATION(S)

This application is a continuation of U.S. patent application Ser. No. 14/250,000, filed on Apr. 10, 2014, entitled "PARTIAL GARBAGE COLLECTION FOR FAST ERROR HANDLING AND OPTIMIZED GARBAGE COLLECTION FOR THE INVISIBLE BAND", which claims the benefit of U.S. Provisional Application No. 61/955,418 filed Mar. 19, 2014, the disclosures of which are hereby incorporated in their entirety by reference.

BACKGROUND

Technical Field

Apparatuses and methods consistent with the present inventive concept relate to memory erase operations in a data storage device (DSD) such as a solid-state drive (SSD) and more particularly to minimizing a size of a garbage collection operation.

Related Art

FIG. 1 is a diagram illustrating a representative memory device used in a DSD such as an SSD. A DSD may contain a plurality of solid-state memory devices, for example, 16 or more solid-state non-volatile memory devices (also referred to herein as dies) 100, for example, but not limited to flash memory devices or other non-volatile memory devices. A die 100 may include a plurality of memory blocks 110 with each block including a plurality of flash pages (F-pages) 120. The memory blocks 110 in the solid-state memory device 100 may be divided into planes of even-numbered blocks 130 and odd-numbered blocks 140. Each of the plurality of memory blocks 110 on a die 100 may be accessed by a separate memory channel. A DSD is generally a device that electronically stores data, so in other embodiments, the DSD may additionally include other types of memory such as rotational magnetic media (e.g., a solid-state hybrid drive (SSHD).

During a garbage collection operation valid data is copied from a first memory region to a second memory region to facilitate erasing of the first memory region.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Overview

Figure 2:
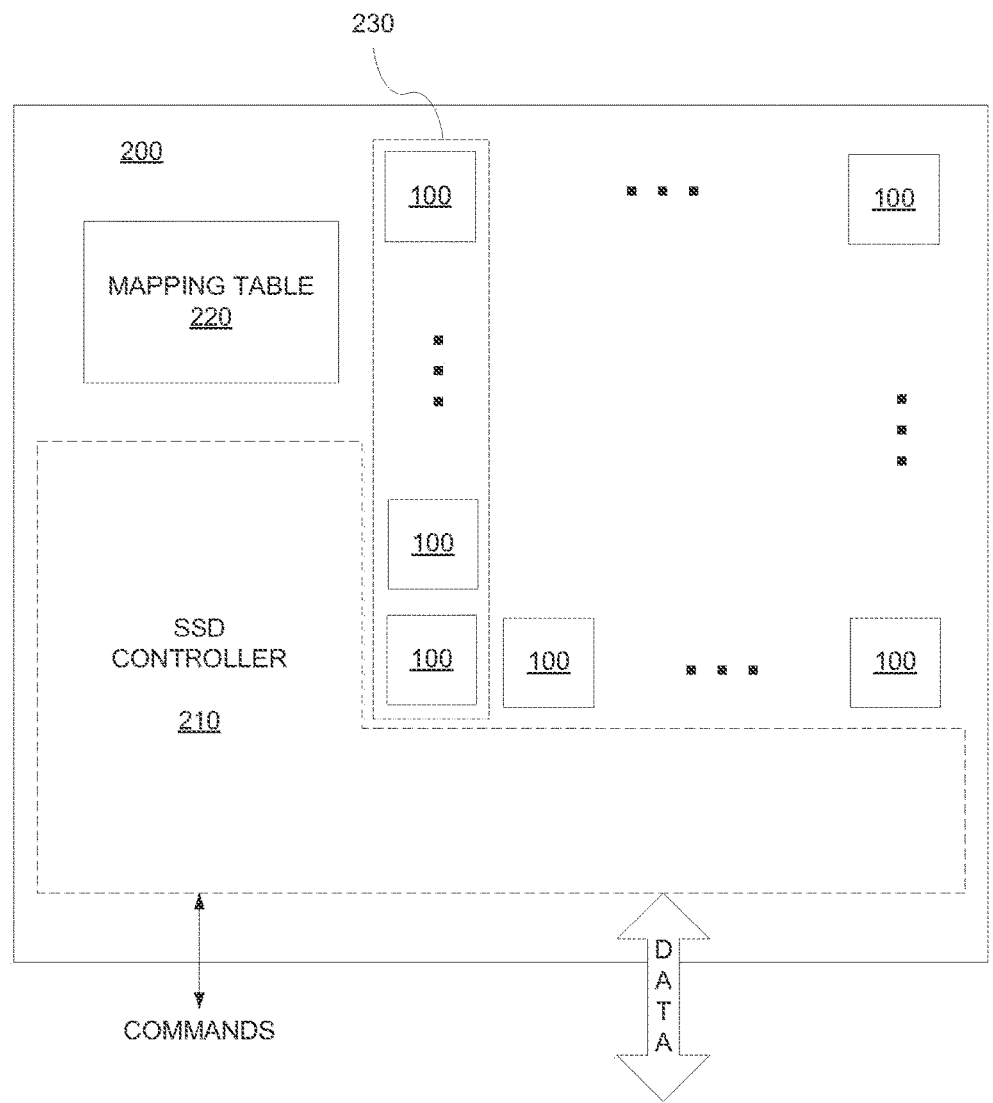
FIG. 2 is a block diagram illustrating an DSD according to an example embodiment of the present inventive concept.

FIG. 2 is a block diagram illustrating an DSD according to an example embodiment of the present inventive concept. The DSD 200 may include a controller 210 (e.g., SSD controller) that may control overall operation of the DSD 200, a mapping table 220 that may contain entries describing a logical-to-physical correspondence of data in the DSD 200, and a plurality of dies 100, for example, but not limited to, flash memory or other non-volatile memory devices. The plurality of dies 100 may be logically arranged in a matrix.

Figure 1:
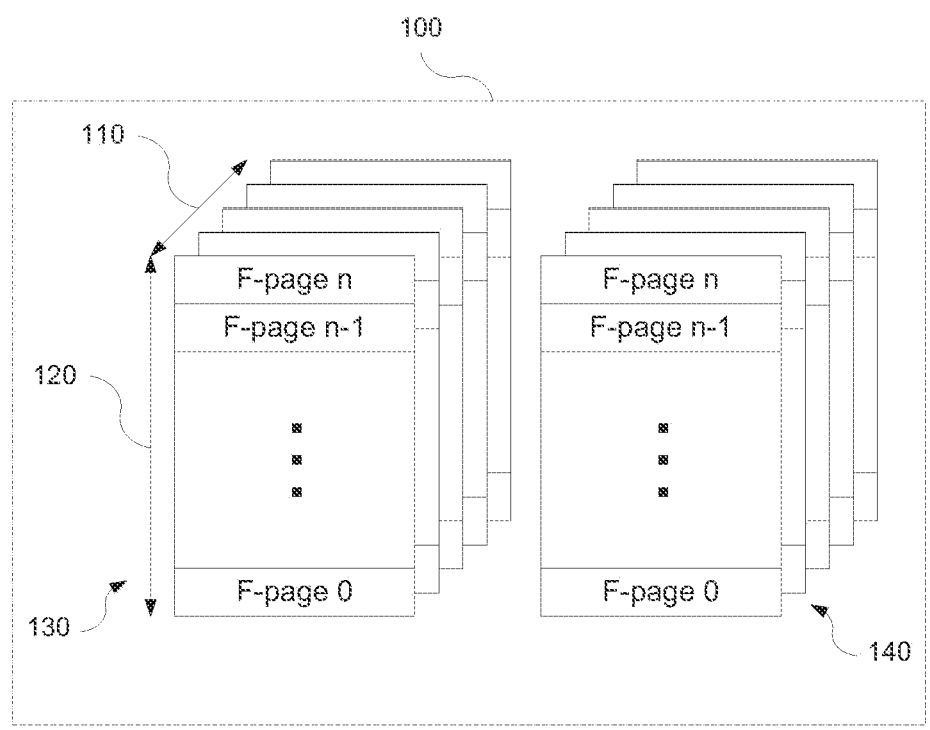
FIG. 1 is a diagram illustrating a representative DSD.

Garbage collection on an DSD 200 involves saving valid data from a certain memory region of one or more of the plurality of dies 100 by copying the valid data to a new location and then erasing the whole region within the DSD 200 from which the data were copied. After being erased, the memory region may be re-used. In conventional garbage collection methods, the garbage collection typically operates on a block management region basis, and the region typically corresponds to a unit of a super block (S-block) 230. Each S-block 230 may include N memory blocks 110 (refer to FIG. 1), where N is the number of dies 100. As each memory block 110 could contain many megabytes (MB) of storage space, the total data to be garbage collected at the S-block level may approach the gigabyte (GB) range.

Garbage collection is described in detail in U.S. application Ser. No. 13/654,288 filed Oct. 17, 2012, the disclosure of which is hereby incorporated in its entirety by reference.

Optimized Garbage Collection

Some embodiments of the present inventive concept involve minimizing the smallest size memory region for which the garbage collection operation can be performed in certain situations. In example embodiments of the present inventive concept, the smallest size memory region for garbage collection may be an area covered by one system journal, or S-journal. In some embodiments, where an area covered by one S-journal includes multiple F-pages, the smallest size memory region may be a sub-part of an area covered by the S-journal, such as a single F-page.

Figure 3:
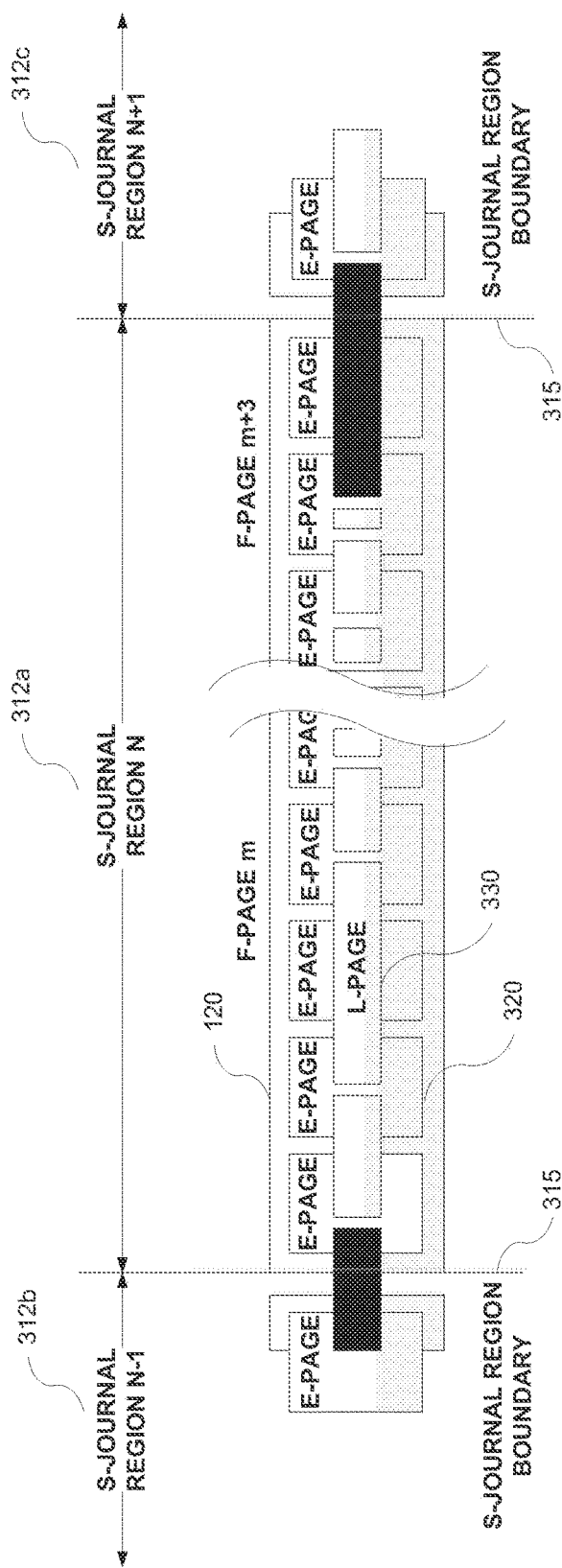
FIG. 3 is a diagram illustrating a memory region described by a journal according to an example embodiment of the present inventive concept.

FIG. 3 is a diagram illustrating a physical area of memory covered by an S-journal according to an example embodiment of the present inventive concept. The controller 210 may be configured to maintain, in the plurality of non-volatile memory devices 100, a plurality of S-journals defining physical-to-logical address correspondences. An S-journal may cover a physical memory region that has a size of 32 E-pages (i.e., error correction code (ECC) page) of flash memory space. One of ordinary skill in the art will appreciate that more than one S-journal, and/or other S-journal sizes and/or other size memory regions may be used.

Referring to FIG. 3, in an example embodiment, an S-journal may record physical-to-logical mapping information for a region spanning one or more E-pages 320, one or more logical segments of data, or logical pages (L-pages), 330, and one or more F-pages 120. For example, as shown in FIG. 3, S-journal N records the mapping information for an S-Journal region N 312a spanning four F-pages (F-page m to m+3) and all the E-pages and L-pages contained within. Several E-pages can reside within an F-page. An E-page 320 (i.e., error correction code (ECC) page) may form the basis for physical addressing and may be of a predetermined fixed size. L-pages 330 can have variable sizes, due to, for example, compression. As shown, they may be contained within a single E-page 320, or may span two or more E-pages 320. L-pages 330 may also span S-journal region boundaries 315. With a nominal 2 KB memory E-page size, an S-journal may record mapping information for 32 E-pages 320, which may span several dies 100.

Referring back to FIG. 2, in one embodiment, the various S-blocks are assigned to different bands such as a data band and a system band. In one embodiment, S-journal data is used to track the logical data written to a given S-block 230 in the data band. An S-journal contains physical-to-logical mapping information for a region within a given S-block 230, which as explained above could include four F-pages (or 32 E-pages), for example. The precise number may depend on system configuration. Also, as data is compressed, the L-pages can vary in size and thus there can be a variable number of L-pages 330 in an S-journal region 312 within a given S-block 230. Thus, the S-journal may itself vary in size, since an entry is needed per L-page. In one embodiment, the S-journal data is collected and written out sequentially to S-blocks in the system band. In example embodiments of the present inventive concept, a smallest physical region of memory that can be selected to be garbage collected is an F-page 120.

When a need for garbage collection occurs (e.g., a data access error such as a program error is encountered), having a small minimum memory region for garbage collection allows for localized garbage collection, thereby speeding up recovery.

Figure 4:
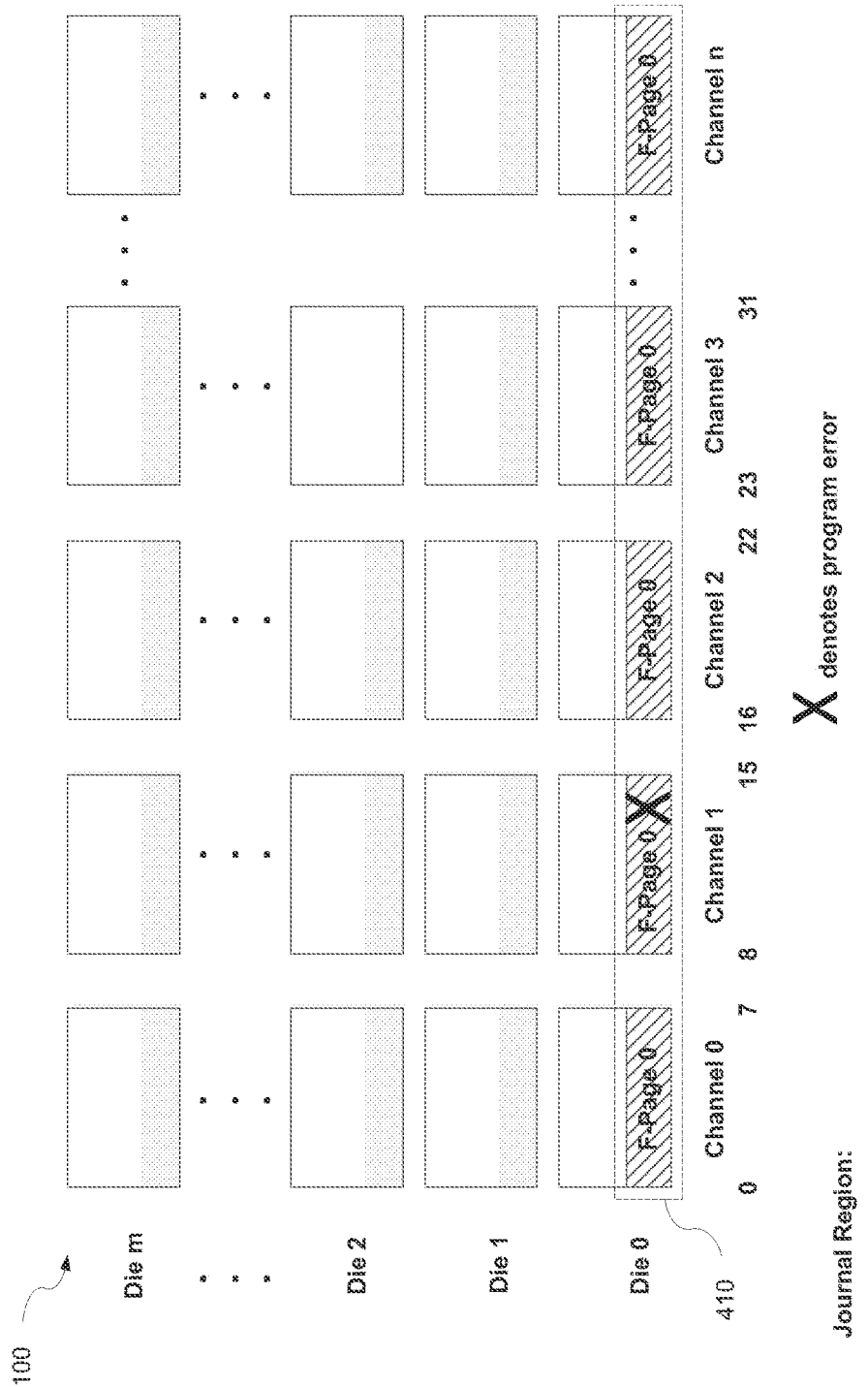
FIG. 4 is a diagram illustrating the occurrence of a program error according to an example embodiment of the present inventive concept.

FIG. 4 is a diagram illustrating the occurrence of a program error according to an example embodiment of the present inventive concept. Referring to FIG. 4, a journal region 410 may include die 0, page 0 of channels 0-n. As an illustrative example, if a program error occurs in a physical location in the physical region of memory, for example in channel 1, F-page 0, die 0, the garbage collection may be confined to the journal region 410, i.e., the collection of F-page 0's as shown, which spans 64 KB where n=7 and an F-page is of 8 KB size. On the other hand, with conventional garbage collection, up to several GB of data may be involved in a garbage collection since it manages memory by block management region. Even if the error occurs in channel 1, F-page 8 of die 0 and the nine S-journal regions covering pages 0-8 need to be garbage collected, 64 KB×9 pages is a small size for garbage collection compared to several GB of data required for a conventional garbage collection operation.

Figure 5:
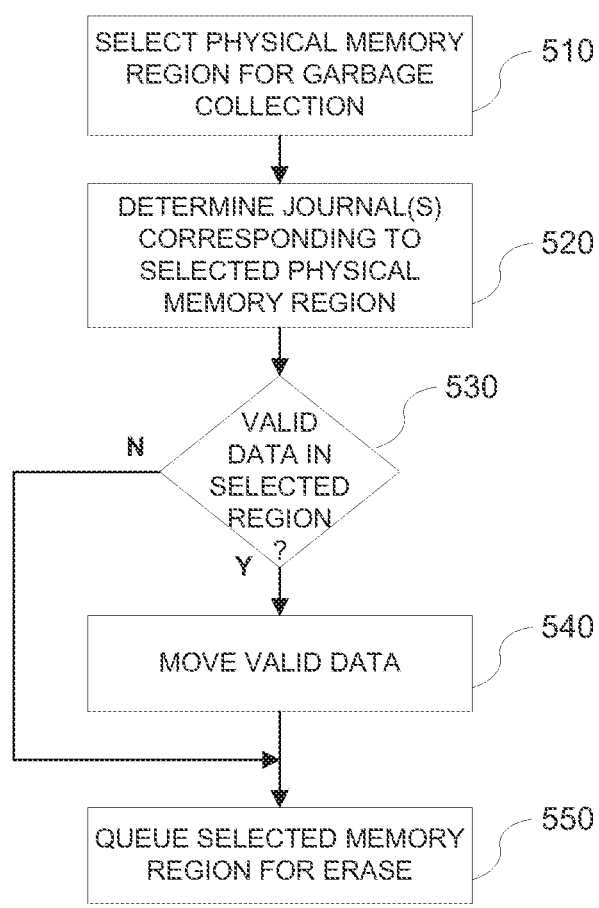
FIG. 5 is a flowchart illustrating a method for managing garbage collection of memory locations according to an example embodiment of the present inventive concept.

FIG. 5 is a flowchart illustrating a method for managing garbage collection of memory locations according to an example embodiment of the present inventive concept. Referring to FIG. 5, the controller 210 may select a physical region of memory to be garbage collected from the plurality of dies 100 (510). The selected physical region of memory may be a subset of a block management region, for example, but not limited to, a portion of one or more memory blocks 110 from the plurality of dies 100 in the DSD 200 (e.g., an F-page or a journal area spanning several F-pages). For example, the controller 210 may select the physical region of memory upon detection of a high bit error count during a read operation. Garbage collecting may then be performed on the selected physical region of memory.

The selected physical region of memory may be in a data band and may be associated with a data band S-journal. In some cases, the selected physical region of memory in the data band may store at least one L-page 330 that spans S-journal region boundaries 315 of the data band S-journal (refer to the black L-pages in FIG. 3). In that case, more than one S-journal may correspond to the selected physical memory region. For example, if garbage collecting on S-journal region N, S-journal N–1 may need to be processed if an L-Page 330 reaches into the region covered by S-journal N–1. Thus, two S-journals may be involved in the garbage collection. The controller 210 may determine one or more S-journals corresponding to the selected physical region of memory (520). The one or more S-journals may contain mapping information transaction entries indicating what logical data (i.e., logical pages) are written to memory locations in the selected physical region.

The controller 210 may determine whether the memory locations within the selected physical region of memory contain valid data based on a comparison of information in the one or more S-journals and a mapping table 220 (530). If the selected physical region of memory contains valid data (530-Y), the controller 210 may cause the valid data to be copied to memory locations in memory regions other than the selected physical region of memory (540). After the valid data, if any, is moved, the controller 210 may queue the selected physical region of memory for erasure (550).

Some embodiments of the present inventive concept may also be applied to enable piecemeal garbage collection on the invisible band S-journals which allows for garbage collection of a large number (e.g., many millions) of entries to be performed in manageable chunks to avoid thrashing and/or congestion.

Figure 6:
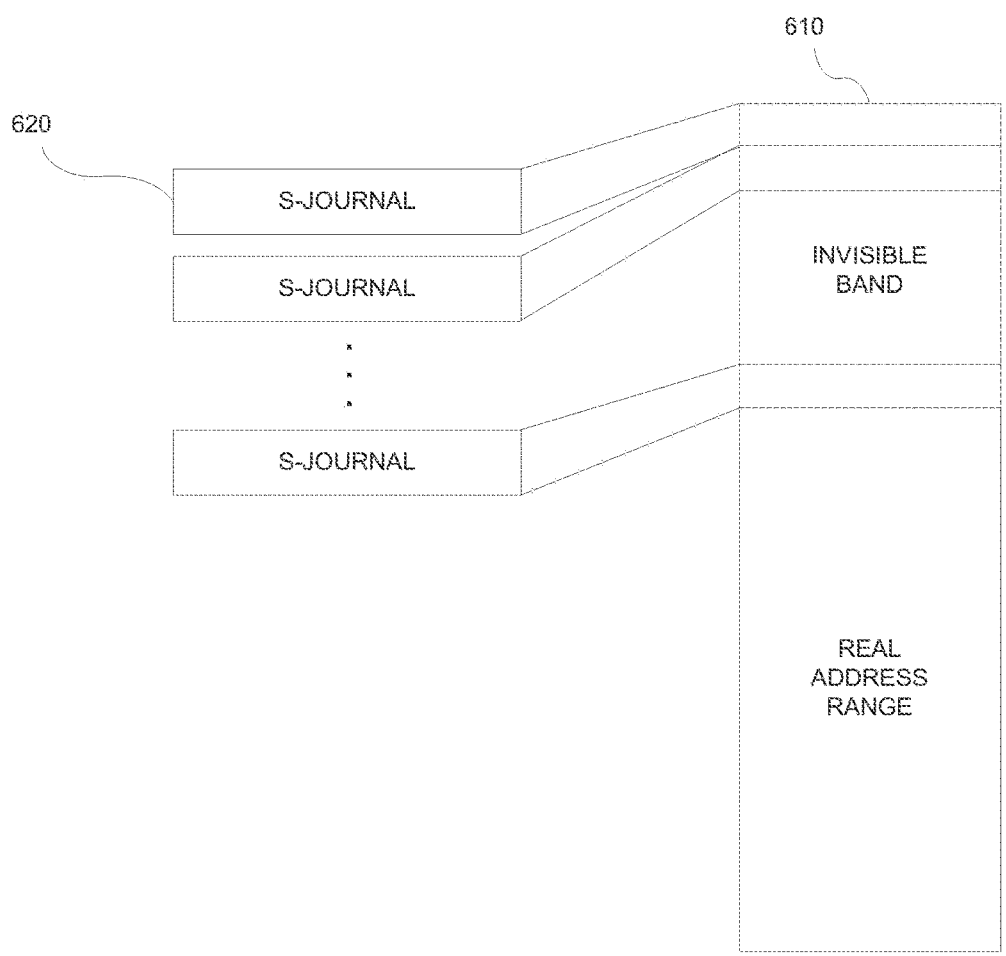
FIG. 6 is a block diagram illustrating S-journals for an invisible band according to an example embodiment of the present inventive concept.

FIG. 6 is a block diagram illustrating S-journals for an invisible band according to an example embodiment of the present inventive concept. In one embodiment, an invisible band 610 is a special memory address range designed for denoting that logical data has been invalidated. In other words, there are no physical, i.e., real, memory blocks mapped to the invisible band. However, the invisible band is used to support TRIM operations, and correspondingly, invisible band S-journals 620 are created for TRIM operation entries containing logical addresses corresponding to a non-existent address space in the invisible band which are essentially empty L-pages. Instead of storing L-pages of zeros, a journal entry is created. A TRIM command marks as free space data that no longer needs to be kept track of.

An invisible band S-journal 620 may include thousands of entries. Due to the large number of entries, garbage collecting the entire S-journal 620 at one time could lead to congestion. In an example embodiment, this thrashing/congestion problem may be prevented by scheduling garbage collection for portions of the S-journal 620 entries as follows:

garbage collect user data areas covered by 150 S-journal entries (150×10 to 20 entries)=1,500 to 3,000 entries;
    garbage collect one invisible band S-journal (approximately 3,000 entries);
    garbage collect user data areas covered by another 150 S-journal entries (150×10 to 20 entries)=1,500 to 3,000 entries;

garbage collect another invisible band S-journal (approximately 3,000 entries)

Figure 7:
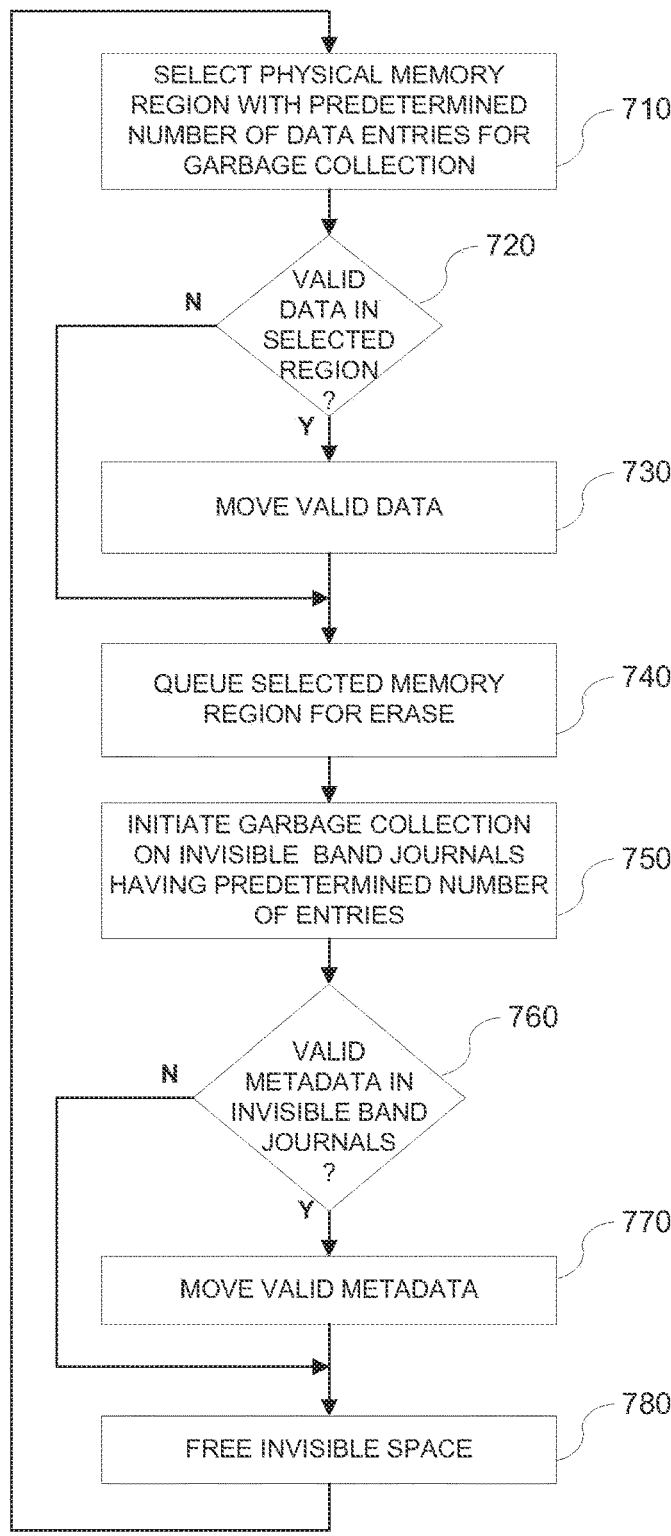
FIG. 7 is a flowchart illustrating a method for managing garbage collection of memory locations and invisible band journals according to an example embodiment of the present inventive concept.

In example embodiments of the present inventive concept, the controller 210 may interleave user data band S-journal-based and invisible band S-journal-based garbage collection to split processing time so that no one process dominates. Thus, by scheduling garbage collection to alternate between the data band and the invisible band, the thrashing/congestion problem may be prevented. FIG. 7 is a flowchart illustrating a method for managing garbage collection of memory locations and invisible band journals according to an example embodiment of the present inventive concept.

Referring to FIG. 7, the controller 210 may select a physical region of memory having a predetermined number of data entries to be garbage collected from the plurality of dies 100 (710). The controller 210 may determine one or more S-journals corresponding to the selected physical region of memory. The selected physical region of memory may be a subset of a block management region, for example, but not limited to, a portion of one or more memory blocks 110 from the plurality of dies 100 in the DSD 200 (e.g., an F-page or a journal area spanning several F-pages). For example, the physical region of memory may be selected upon detection of a high bit error count during a read operation. Garbage collecting may then be performed on the selected physical region of memory.

The controller 210 may determine whether the memory locations within the selected physical region of memory contain valid data based on a comparison of information in the S-journal and a mapping table 220 (720). If the selected physical region of memory contains valid data (720-Y), the controller 210 may cause the valid data to be copied to memory locations in memory regions other than the selected physical region of memory (730). After the valid data, if any, is moved, the controller 210 may queue the selected physical region of memory for erasure (740).

The controller 210 may cause garbage collection to be performed on one or more invisible band S-journals 620 containing mapping information transaction entries recording what logical data are mapped to a location designed for denoting that logical data has been invalidated (750). The controller 210 may select the invisible band S-journals 620 to contain substantially the same number of recorded mapping information transaction entries as the predetermined number of data band S-journal entries corresponding to a physical region of memory to be garbage collected.

The controller 210 may determine whether the one or more invisible band S-journals 620 contain valid metadata (760). If the selected one or more invisible band S-journals 620 contain valid metadata (760-Y), the controller 210 may cause the valid metadata to be copied to invisible band S-journals 620 other than the selected invisible band S-journals 620 (770). After the valid metadata, if any, is moved, the controller 210 may cause the invisible space corresponding to the one or more invisible band S-journals 620 to be freed for use (780).

The example embodiments disclosed herein can be applied to solid-state drives, hybrid hard drives, and the like. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (non-volatile solid-state memory) chips. In addition, other forms of storage, for example, but not limited to, DRAM or SRAM, battery backed-up volatile DRAM or SRAM devices, EPROM, EEPROM memory, etc., may additionally or alternatively be used. As another example, various components illustrated in the figures may be implemented as software and/or firmware on a processor, ASIC/FPGA, or dedicated hardware. Also, the features and attributes of the specific example embodiments disclosed above may be combined in different ways to form additional embodiments, all of which fall within the scope of the present disclosure.

While certain embodiments have been described, these embodiments have been presented by way of example only, and are not intended to limit the scope of the protection. The methods and systems described herein may be embodied in a variety of other forms. Various omissions, substitutions, and/or changes in the form of the example methods and systems described herein may be made without departing from the spirit of the protection.

What is claimed is:

1. A method for managing garbage collection for an invisible band in a data storage device (DSD), the method comprising:
   designating an invisible band that comprises a memory address range designed to indicate that logical data has been invalidated;
   creating one or more invisible band S-journals for TRIM operations, wherein the one or more invisible band S-journals contains mapping information transaction entries recording what logical data are mapped to a location designed for denoting that logical data has been invalidated;
   scheduling garbage collection for the one or more invisible band S-journals by alternating garbage collection on the one or more invisible band S-journals with garbage collection on one or more data band S-journals, wherein the one or more data band S-journals contain mapping information transaction entries indicating what logical data are written to memory locations in a selected physical region of the DSD; and
   performing the scheduled garbage collection.

2. The method of claim 1, wherein the one or more invisible band S-journals scheduled for garbage collection contains substantially a same number of entries as the one or more data band S-journals scheduled for garbage collection.

3. The method of claim 1, comprising:
   determining whether a first invisible band S-journal scheduled for garbage collection contains valid metadata;
   copying the determined valid metadata from first invisible band S-journal to a second invisible band S-journal; and
   freeing the first invisible band S-journal for use.

4. A data storage device (DSD), comprising:
   a controller;
   a plurality of dies, each die comprising a plurality of memory blocks, an invisible band that comprises a memory address range designed to indicate that logical data has been invalidated; and
   one or more invisible band S-journals created by TRIM operations, wherein the one or more invisible band S-journal contains mapping information transaction entries recording what logical data are mapped to a location designed for denoting that logical data has been invalidated;
   wherein the controller is configured to schedule garbage collection for the one or more invisible band S-journals by alternating garbage collection on the one or more invisible band S-journals with garbage collection on one or more data band S-journals, wherein the one or more data band S-journals contains mapping information transaction entries indicating what logical data are written to memory locations in a selected physical region of the DSD; and wherein the controller is configured to perform the scheduled garbage collection.

5. The DSD of claim 4, wherein the one or more invisible band S-journals scheduled for garbage collection contains substantially a same number of entries as the one or more data band S-journals scheduled for garbage collection.

6. The DSD of claim 4, wherein the controller configured to:

determine whether a first invisible band S-journal scheduled for garbage collection contains valid metadata;

copy the determined valid metadata from first invisible band S-journal to a second invisible band S-journal; and free the first invisible band S-journal for use.

* * * * *